United States Patent Office 2,906,127
Patented Sept. 29, 1959

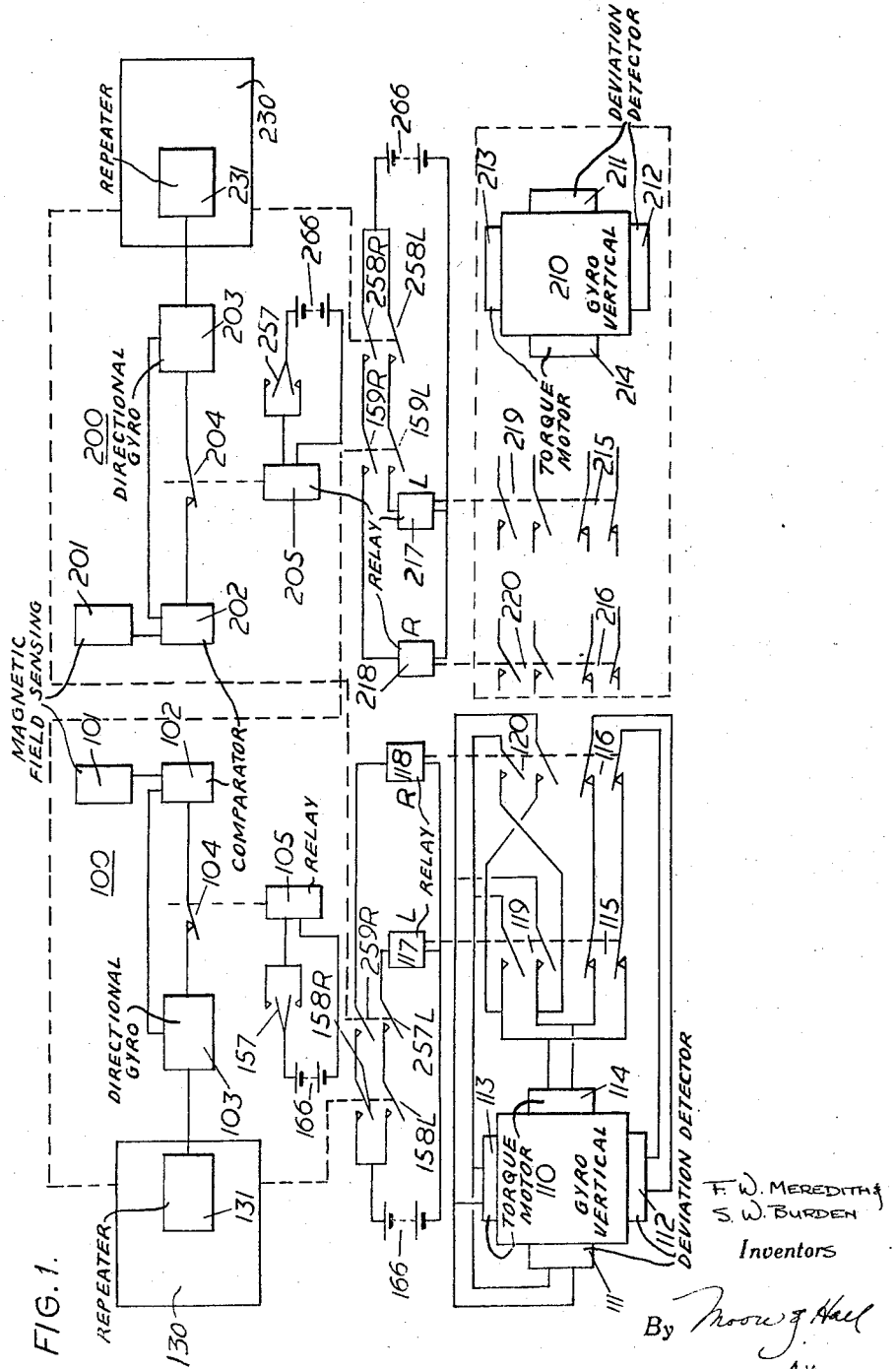

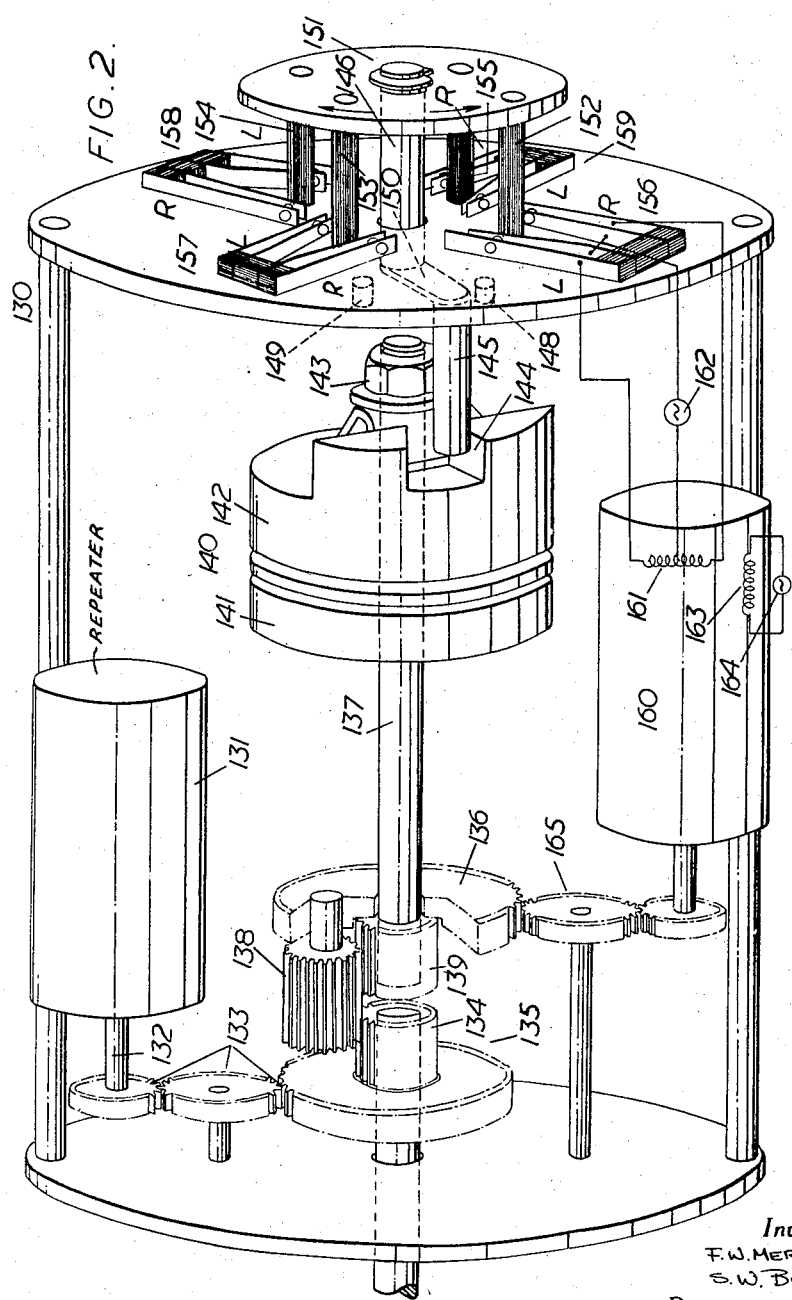

2,906,127

NAVIGATIONAL INSTRUMENTS FOR AIRCRAFT

Stanley W. Burden, White Farm, Tring, and Frederick William Meredith, Cleeve Hill, Cheltenham, England, assignors to Smiths America Corporation, Washington, D.C.

Application June 3, 1957, Serial No. 663,292

6 Claims. (Cl. 74—5.4)

The present invention relates to navigational instruments for aircraft and is concerned with the improvement of the accuracy of instruments of the kind monitored by devices responsive to or affected by gravity and which are susceptible to disturbance during turning flight owing to the deviation which then occurs between the directions of true and apparent gravity. Such instruments respond to the directional fields produced by the earth, either gravitational or magnetic, and average or smooth out apparent deviations of these fields caused by oscillatory motion of the aircraft. Examples of such instruments are gyromagnetic compasses in which a directional gyroscope is monitored by a pendulously-mounted magnetic field sensitive device and gyro verticals, in which a gyroscope is precessed under the control of pendulous devices so that its spin axis has a fixed relationship, either coincident with or offset by a small known angle from the direction of apparent gravity. Proposals have been made to change the monitoring regime of such instruments in a turn. It has been proposed, for example, to inhibit monitoring of the directional gyroscope in a gyromagnetic compass during a turn, the drift errors accumulating during a turn being less than the errors which would be due to the disturbance of the magnetic field sensitive device. It has also been proposed to inhibit monitoring of a gyro vertical by the pendulous device responsive to bank deviation during a turn, and control the usual precessing torque motors acting about both bank and pitch axes by the pendulous device responsive to pitch deviation (relying of course on the fact that a "pitch" component of deviation at one point in a turn gives rise to a corresponding "bank" component of deviation 90° later in the turn, the relation of the sense of the "bank" deviation to the sense of the "pitch" deviation depending upon the direction of the turn). If the change of monitoring regime is dependent solely upon the rate of turn exceeding some predetermined value in certain circumstances the monitoring will not be satisfactory. For example if the aircraft is flying on a weaving course, so that its rate of turn oscillates on either side of zero, a simple control of the monitoring regime in accordance with rate of turn will mean that it will only be in its normal condition for a short fraction of the time, as the rate of turn passes through zero, with the result that the accuracy will be lower than if the monitoring regime remained continually in its normal condition (as, in that condition, the disturbances due to turning will, over any substantial period, average out to zero).

It is the object of the present invention to provide means to control the monitoring regime of instruments of the kind referred to not suffering from the above mentioned disadvantages.

According to the present invention the monitoring regime of instruments of the kind referred to is only changed from the normal regime appropriate to straight flight to that appropriate to turning flight if both the rate and amount of turn of the craft from an established straight course exceed certain predetermined values.

Preferably means to control the monitoring regime of instruments of the kind referred to comprise a shaft, means to rotate said shaft at a rate proportional to the rate of turn of the aircraft, a slipping clutch whose driving member is driven by said shaft, means to limit movement of the driven member of the clutch relative to a datum position thereof, first means responsive to displacement of the driven member of the clutch relative to the said datum position to reduce such displacement to zero at a predetermined rate and second means responsive to displacement of the driven member of the clutch relative to the said datum position in excess of a first predetermined amount to select the monitoring regime appropriate to turning flight.

Preferably the first means responsive to displacement of the driven member of the clutch are operative when the said displacement exceeds a second predetermined value, less than the first.

Preferably the shaft drives one input of a conventional differential mechanism whose output shaft drives the driven member of the clutch and whose other input is driven at a constant rate in an appropriate direction under the control of the first means responsive to displacement of the driven member of the clutch.

It will be seen that a change of monitoring regime only occurs when there is a persistent rate of turn at a value greater than that corresponding to the predetermined rate.

The relevant features of an aircraft instrumentation system embodying the present invention will now be described with reference to the accompanying drawings, of which:

Figure 1 shows certain components of the system in a schematic fashion.

Figure 2 shows certain components in greater detail.

The system comprises two similar gyromagnetic compass installations, indicated generally at 100 and 200. System 100 has a pendulous magnetic field sensing device 101, a comparator 102 and a directional gyroscope 103, the gyroscope being normally monitored by precessing it under the control of a signal, derived by comparator 102 in accordance with a discrepancy between the directional references defined by the gyroscope and field sensing device, to reduce the discrepancy to zero. Monitoring may be inhibited by interrupting this signal by opening a normally-closed contact 104, controlled by a relay 105. Corresponding components of system 200 are similarly labelled.

The system also comprises two similar independent gyro verticals, indicated at 110, 210 respectively, gimballed in the normal way for rotation about the roll and pitch axes of the aircraft. Gyro vertical 110 has pendulous devices indicated at 111 and 112 respectively generating electric signals in response to deviation of the spin axis of the gyroscope from the vertical in pitch and roll respectively. The signal from device 111 is permanently applied to a torque motor indicated at 113, adapted to apply a precessing torque about the roll axis and thus precess the gyroscope in pitch to remove deviation in pitch. Similarly the signal from device 112 is applied in straight flight to a torque motor 114 adapted to precess the gyroscope in roll to remove deviation in roll, the signal passing through normally-closed contacts 115, 116 controlled by relays 117, 118 respectively. Relay 117 also controls normally-open contacts 119 and relay 118 normally-open contacts 120. Moving contacts 119 and 120 are connected to device 111, and the corresponding fixed contacts are connected to motor 114. The connections are such that upon energisation of relay 117 the "roll" signal from device 112 is disconnected and the "pitch" signal from device 111 applied in its place, and upon energisation of relay 118, a similar condition holds, except that the sense of connection of the "pitch" signal is reversed. Energisation of relay 117 gives what is sometimes called "pitch-bank erection" for left turning flight, an energisation of relay 118 pitch-bank erection for right turning flight. Gyro vertical 210 is associated with similar components which are indicated by similar numerals. Certain of the connections associated with it are omitted for clarity.

The energisation of relays 105, 205, 117, 118, 217 and 218 is controlled by a pair of similar devices, one associated with each of the gyromagnetic compass installations 100, 200. One of these, for definiteness taken to be that associated with installation 100, is shown in Figure 2, and indicated generally at 130.

This device has a repeater 131 controlled from directional gyroscope 103, which rotates a shaft 132 in accordance with changes in the heading of the aircraft. Shaft 132 drives, through gears 133, a sun pinion 134, which constitutes one input member of an epicyclic differential 135. The other input member of the differential is a gear 136, mounted for free rotation about a shaft 137 co-axial with pinion 134. Gear 136 carries a stub shaft upon which is mounted for free rotation a planet pinion 138 which meshes both with pinion 134 and with a further pinion 139 fixed to shaft 137 and having one tooth more than pinion 134. Thus it will be seen that upon rotation of pinion 134 and gear 136, shaft 137 is rotated through an angle which is a sum of multiples of these rotations.

Shaft 137 drives the driving member, 141, of a friction clutch generally indicated at 140. The driven member of the clutch is indicated at 142. The slipping torque of the clutch may be adjusted by means of nut 143. Driven member 142 is provided with a slot 144. A pin 145, mounted on a shaft 146, co-axial with shaft 137, by means of a crank 150, may engage with the walls of slot 144, thus providing a lost motion connection between shafts 137 and 146. Shaft 146 passes through a plate 147 of insulating material on which are formed bosses 148, 149 limiting movement of crank 150. Shaft 146 carries a plate 151 on which are mounted four pegs 152, 153, 154 and 155 of insulating material, extending towards plate 147. These pegs are arranged to operate respectively four generally similar sets of spring loaded pairs of contacts 156, 157, 158 and 157. Contacts 156 are so arranged that any appreciable movement of crank 150 from a position midway between bosses 148, 149 results in closure of one or other of the two contacts, labelled 156L and 156R respectively. Contacts 156L and 156R control the energisation of a centre-tapped winding 161 of a two-phase induction motor 160 from an A.C. source 162. The other phase winding 163 of motor 160 is constantly energised from a further source 164 in quadrature with source 162. Motor 160 drives gear 136 (of differential 135) through gears 165. The connections to motor 160 are such that if rotation of repeater 131 and thus, pinion 134, and hence of shaft 137, occurs in a sense to produce closure of, say, contacts 156L, the rotation of motor 160 is in a sense to re-open them. Such rotation will be produced by a left turn of the aircraft; and a corresponding state of affairs holds for a right turn.

The remaining sets of contacts 157 to 159 are not operated until crank 150 has moved an appreciable distance, short of engagement with bosses 148, 149 from its mid position, whereupon all the corresponding contacts ("L" or "R" as the case may be) are engaged simultaneously.

A precisely similar device to that designated as 130 is associated with installation 200.

Contacts 157 control the energisation of relay 105 from a source 166, the relay thus being energised to inhibit monitoring of gyroscope 103 when either of contacts 157L, R is closed.

Contacts 158L and 259L are connected in series and control the energisation of relay 117 from source 116. Similarly contacts 158R and 259R control the energisation of relay 118.

A corresponding control is provided of the energisation of relays 205, 217, 218.

It will thus be seen that, provided that the rate of turn of the aircraft does not exceed a predetermined value, determined by the speed of rotation of motor 160 when it is energised and the various gear trains involved, the monitoring regime of the directional gyroscopes and gyro verticals remains that appropriate to straight flight. Similarly, if the deviation from an established course (upon which the lost motion connection of pin 145 and slot 144 will settle down approximately to its mid position) does not exceed a predetermined amount, depending upon the amount of lost motion and the distance plate 151 has to move from its mid-position to operate contacts 157 to 159, the monitoring regime will similarly remain that appropriate to straight flight.

It will be appreciated that continued rotation of shaft 137 results in engagement of arm 150 with one of bosses 148, 149, the clutch 140 then slipping.

Convenient figures relating to the device and suitable for use on large transport aircraft are as follows:

Contacts 156 operated when craft heading changes by more than ±5° from that corresponding to the mid-position of crank 150.

Contacts 157 to 159 operated when craft heading changes by more than ±6° from that corresponding to the mid-position of crank 150.

Rate of rotation of motor 160 when energised corresponds to a rate of turn of the craft of ±30° per minute.

Thus unless the rate of turn of the craft exceeds 30° per minute, and the amount of turn from an established course exceeds, on the average, about ±6° the monitoring regime appropriate to straight flight will be maintained.

It will be seen that there will be no change of the gyro vertical monitoring regime unless both compass installations are consistent as indicating turn in the same sense. Thus to give faulty continuous operation in the turning flight regime there would have to be similar faults on both compass installations, which is a situation unlikely to occur in practice.

We claim:

1. An angular reference system for use on an aircraft comprising a gyroscope to provide an angular reference, misalignment detecting means responsive to misalignment between said angular reference and a reference-defining field external to the craft, said misalignment-detecting means being affected by displacement between the directions of true and apparent gravity during turning of the craft, torque generating means, adapted to apply precessing torques to the gyroscope and adjust the aforesaid angular reference, settable operative connections between the misalignment detecting means and the torque generating means, said operative connections having one condition appropriate to straight flight and at least one other condition appropriate to turning flight, means responsive to rate and amount of turn of the craft, said means being arranged to control the settable operative connections to set the same in a condition appropriate to turning flight when both the amount and rate of turn exceed predetermined values and otherwise to set the same in the condition appropriate to straight flight.

2. A vertical reference system for use on an aircraft comprising a gyro vertical, gimballed for rotation about the pitch and roll axes of the aircraft and the direction of whose spin axis provides the required reference, first and second pendulous detectors mounted upon the gyroscope and responsive to deviation of the reference from the direction of apparent gravity in pitch and roll respectively, first and second torque motors arranged to apply torques to the gyroscope about the roll and pitch axes respectively, permanent operative connections between the first torque motor and the first pendulous detector to energize the first torque motor to correct deviation in pitch, settable connections between a second torque motor and the first and second pendulous detectors, said settable connections having three conditions, in the first condition of said settable connections the second torque motor being connected to the second detector so that it corrects deviation in roll, and in the second and third conditions of said settable connections the second torque motor being connected to the first detector in senses to minimize accumulation of deviation in turning flight to right or left, respectively, and means responsive to sense, rate and amount of turn of the craft, said means being arranged to control the settable connections to set the same in the second or third condition when both rate and amount of turn to right or left as the case may be, exceed predetermined values and otherwise to set the same in the first condition.

3. A directional reference system for use on aircraft comprising a directional gyroscope gimballed for rotation in yaw and about a horizontal axis and the direction of whose spin axis provides the required reference, a magnetic field sensitive device mounted on the aircraft and responsive to the apparent direction of the earth's magnetic field, a comparator connected to said directional gyroscope and said magnetic field sensitive device to give an output in accordance with deviation between the reference and the apparent direction of the earth's magnetic field, a torque motor arranged to apply torque to the gyrcoscope about the horizontal axis, a settable connection disposed between the output of the comparator and the torque motor, in a first condition of said settable connection the output of the comparator being applied to the torque motor to reduce the deviation, and in a second condition the output of the comparator being disconnected, and means responsive to rate and amount of turn of the craft, said means being arranged to control the settable connection to set the same in the second condition when both rate and amount of turn exceed predetermined values and otherwise to set the same in the first condition.

4. A directional reference system as claimed in claim 3, wherein the means responsive to amount and rate of turn of the craft comprise a repeater operatively connected to the gyroscope and positioned in accordance with movement of the directional reference with respect to the craft.

5. A combined vertical and directional reference system for use on aircraft comprising a gyro-vertical, gimballed for rotation about the pitch and roll axes of the aircraft and the direction of whose spin axis provides the required vertical reference, first and second pendulous detectors mounted upon the gyroscope and responsive to deviation of the vertical reference from the direction of apparent gravity in pitch and roll, respectively, first and second torque motors arranged to apply torque to the gyroscope about the roll and pitch axes respectively, permanent operative connections between the first torque motor and the first pendulous detector to energize the first torque motor to correct deviation in pitch, settable connections between the second torque motor and the first and second pendulous detectors, said settable connections having three conditions, in the first condition of said settable connections, the second torque motor being connected to the second detector so that it corrects deviation in roll, and in the second and third conditions of said settable connections the second torque motor being connected to the first pendulous detector, in senses to minimize accumulation of deviation in turning flight to right or left respectively, a directional gyroscope gimballed for rotation in yaw and about a horizontal axis and the direction of whose spin axis provides the directional reference, a magnetic field sensitive device mounted on the aircraft and responsive to the apparent direction of the earth's magnetic field, a comparator connected to said directional gyroscope and said magnetic field sensitive device to give an output in accordance with deviation between the directional reference and the apparent direction of the earth's magnetic field, a third torque motor arranged to apply torque to the directional gyroscope about its horizontal axis, a further settable connection disposed between the output of the comparator and the third torque motor, in a first condition of said further settable connection the output of the comparator being applied to the third torque motor to reduce the deviation, and in a second condition of said further settable connection the comparator being disconnected, a repeater operatively connected to the directional gyroscope and positioned in accordance with movement of the directional reference with respect to the craft, and means controlled by said repeater, said means being arranged to control the said connections to set the settable connections in their second or third conditions according to whether the turn is to the right or left respectively and the further settable connection in its second condition when both amount and rate of turn exceed predetermined values, and otherwise to set those connections in their first condition.

6. A vertical and directional reference system as claimed in claim 5, wherein the means controlled by the repeater comprise a shaft driven by said repeater, a slipping clutch having driving and driven members, the driving member being driven by said shaft, stops to limit movement of the driven member relative to a datum position thereafter, first means responsive to displacement of the driven membr of the clutch relative to said datum position to reduce said displacement to zero at a predetermined rate, and connection setting means controlled by the driven member of said clutch, the connection setting means being operative to set the settable connections in their second or third conditions when the displacement of the driven member of the clutch from its datum position exceeds a predetermined amount in the sense corresponding to right or left turn of the craft respectively and simultaneously operative to set the further settable connection in its second condition, and otherwise to set the settable connections and the further settable connection in their first condition.

References Cited in the file of this patent

UNITED STATES PATENTS

| | | |
|---|---|---|
| 2,383,409 | Newell | Aug. 21, 1945 |
| 2,761,331 | Buescher | Sept. 4, 1956 |